United States Patent
Kristensen (10) Patent No.: US 11,629,702 B2
(45) Date of Patent: Apr. 18, 2023

(54) DEVICE FOR DRAINING HUMIDITY IN WIND TURBINES

(71) Applicant: Siemens Gamesa Renewable Energy A/S, Brande (DK)

(72) Inventor: Mikkel Aggersbjerg Kristensen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/311,755

(22) PCT Filed: Oct. 31, 2019

(86) PCT No.: PCT/EP2019/079841
§ 371 (c)(1),
(2) Date: Jun. 8, 2021

(87) PCT Pub. No.: WO2020/120019
PCT Pub. Date: Jun. 18, 2020

(65) Prior Publication Data
US 2022/0025868 A1  Jan. 27, 2022

(30) Foreign Application Priority Data
Dec. 13, 2018 (EP) .................................... 18212369

(51) Int. Cl.
*F03D 80/00* (2016.01)
*F03D 1/06* (2006.01)
*F03D 7/02* (2006.01)

(52) U.S. Cl.
CPC .......... *F03D 80/00* (2016.05); *F03D 1/0633* (2013.01); *F03D 7/0232* (2013.01); *F05B 2240/3052* (2020.08)

(58) Field of Classification Search
CPC ...... F03D 80/00; F03D 1/0633; F03D 7/0232; F03D 3/062; F03D 1/0675;
(Continued)

(56) References Cited

U.S. PATENT DOCUMENTS 5,106,265 A    4/1992  Holzem
5,275,233 A *  1/1994  Little ................... F28D 9/0068
                                          165/113
(Continued)

FOREIGN PATENT DOCUMENTS

EP  0919271 A1 *  7/1998  ............ B01D 45/16
EP  1 623 111 B1    9/2008
(Continued)

OTHER PUBLICATIONS

International Search Report and Written Opinion for PCT/EP2019/079841 dated Feb. 5, 2020.
(Continued)

*Primary Examiner* — Aaron R Eastman
(74) *Attorney, Agent, or Firm* — Schmeiser, Olsen & Watts LLP (57) ABSTRACT

Provided is a wind turbine, including: at least one rotor blade, at least one aerodynamic device for influencing the airflow flowing from the leading edge section of the rotor blade to the trailing edge section of the rotor blade, wherein the aerodynamic device is mounted at a surface of the rotor blade, a pneumatic actuator of the aerodynamic device for actuating the aerodynamic device at least between a first protruded configuration and a second retracted configuration, a pressure supply system for operating the actuator by a pressurized fluid, a centrifugal device rotatable about a rotor axis of the wind turbine, the centrifugal device including an air inlet of receiving a flow of the pressurized fluid including humidity from the pressure supply system and a
(Continued)

water outlet for letting a flow of condensed water to exit the centrifugal device.

12 Claims, 5 Drawing Sheets

(58) Field of Classification Search
CPC ..... F05B 2240/3052; F05B 2240/3062; Y02E 10/72; Y02E 10/74
See application file for complete search history.

(56) References Cited

U.S. PATENT DOCUMENTS

| | | | |
|---|---|---|---|
| 8,851,840 B2 | 10/2014 | Hancock et al. | |
| 2005/0120685 A1* | 6/2005 | Fischer | B01D 45/14 55/406 |
| 2006/0088421 A1 | 4/2006 | Shchukin | |
| 2007/0113403 A1 | 5/2007 | Shchukin | |
| 2011/0212820 A1* | 9/2011 | Klintenstedt | B04B 1/04 494/46 |
| 2011/0217167 A1* | 9/2011 | Hancock | F03D 1/0675 416/23 |
| 2012/0169060 A1* | 7/2012 | Loh | F03D 1/0641 290/55 |
| 2016/0145837 A1 | 5/2016 | Abrari | |
| 2018/0163698 A1* | 6/2018 | Miranda | F03D 1/0675 |
| 2018/0171975 A1* | 6/2018 | Röhm | B64C 9/20 |
| 2022/0002725 A1* | 1/2022 | Tanner | C12N 9/22 |
| 2022/0010771 A1* | 1/2022 | Enevoldsen | F03D 7/0296 |
| 2022/0018336 A1* | 1/2022 | Egedal | F03D 17/00 |
| 2022/0128033 A1* | 4/2022 | Myers | F03D 9/257 |
| 2022/0128034 A1* | 4/2022 | Krogenes | F03D 9/32 |
| 2022/0134358 A1* | 5/2022 | Hagqvist | B04B 1/08 494/37 |
| 2022/0135195 A1* | 5/2022 | Sharrow | B64C 11/16 416/227 R |

FOREIGN PATENT DOCUMENTS

| | | |
|---|---|---|
| EP | 2 321 528 A2 | 5/2011 |
| EP | 3290688 A1 | 3/2018 |
| EP | 3577338 A1 | 12/2019 |
| EP | 3577339 A1 | 12/2019 |
| WO | 2010/023278 A1 | 3/2010 |
| WO | 2018/041420 A1 | 3/2018 |
| WO | 2018/162100 A1 | 9/2018 |
| WO | WO 2018/162100 | 9/2018 |
| WO | WO 2018/162102 | 9/2018 |

OTHER PUBLICATIONS

International Search Report and Written Opinion for PCT/EP2019/079822 dated Jan. 17, 2020.
Extended European Search Report for 18212369.5 dated Jun. 12, 2019.
Extended European Search Report for 18212385.1 dated Jul. 9, 2019.

* cited by examiner

DEVICE FOR DRAINING HUMIDITY IN WIND TURBINES

CROSS-REFERENCE TO RELATED APPLICATIONS

This application claims priority to PCT Application No. PCT/EP2019/079841, having a filing date of Oct. 31, 2019, which is based on EP Application No. 18212369.5, having a filing date of Dec. 13, 2018, the entire contents both of which are hereby incorporated by reference.

FIELD OF TECHNOLOGY

The following relates to a device for draining humidity from a compressed gas in wind turbine turbines by using a centrifugal reaction.

BACKGROUND

In wind turbine generators, the output power and structural loading is controlled by altering blade geometry relative to the wind, either by rotating the blade around its longitudinal axis, i.e., by regulating the pitch angle, by letting the blade flex passively (aeroelastic blades), or by actively controlling devices on the blade surface such as flaps or other flow regulating devices.

An example of such a flow regulating device is a vortex generator (VG) installed on the suction side of the wind turbine rotor blade.

Another example is shown in WO 2018/041420, which discloses a rotor blade comprising aerodynamic device for influencing the air flow flowing from the leading edge section of the rotor blade to the trailing edge section of the rotor blade, wherein the aerodynamic device is mounted at a surface of the rotor blade and comprises a pneumatic or hydraulic actuator, such as a bladder or a cavity of which the volume depends on the pressure of the fluid being present inside the pneumatic or hydraulic actuator.

In general, a flow regulating device may be considered to comprise a device which is capable of enhancing the lift coefficient of the aerofoil section, for example by increasing the level of energy of the boundary layer of the rotor blade.

System for regulating the pitch angle can be split into two categories: electro-mechanical and electro-hydraulic. As both types require one or more volumes of oil, they are typically confined within the hub.

For active aerodynamic devices on the blade surface, the presence of oil represents a significant environmental risk, eliminating the option of hydraulic actuation, whilst lightning strikes are likely to render any electric drive at the blade surface inoperable. Mechanical links such as drawbars or axles are not practicable due to the flexibility of the blade itself, effectively leaving pneumatic actuation as the only efficient operating such devices.

However, any water content in the pressurized supply air, which condensates in the blade surface device or connections leading to it, may be impossible to retract from within the device to the pneumatic supply and control unit in the hub or blade root, due to the centripetal force required to bring the water back to the hub.

Existing solutions for dehumidification of air fall into three main groups: adsorption, membrane, and thermally condensing using Peltier elements or cooling compressors. Any of such technologies cannot be considered optimal.

Adsorption and membrane dehumidifiers require a fixed orientation and do not accept temperatures below 0° C. Peltier elements are unsuitable for larger amounts of air to be dehumidified due to their low efficiency, and cooling compressors add moving parts and very fine tolerances, which do not cope well if exposed to rotation.

Consequently, none of the known above-described technologies for dehumidification is well suited for long term operation under rotation.

Hence, it is desirable to overcome the above inconveniences by providing an improved device for minimizing the water content in the pressurized supply air used for the actuation of aerodynamic devices on the blade surface or, alternatively, to provide extraction of humidity downstream of the active aerodynamic device, e.g., closer to the blade tip.

SUMMARY

An aspect relates to a wind turbine comprising:
at least one rotor blade,
at least one aerodynamic device for influencing the airflow flowing from the leading edge section of the rotor blade to the trailing edge section of the rotor blade, wherein the aerodynamic device is mounted at a surface of the rotor blade,
a pneumatic actuator of the aerodynamic device for actuating the aerodynamic device at least between a first protruded configuration and a second retracted configuration,
a pressure supply system for operating the actuator by a pressurized fluid, wherein the wind turbine further comprises:
a centrifugal device rotatable about a rotor axis of the wind turbine, the centrifugal device comprising an air inlet for receiving a flow of the pressurized fluid including humidity from the pressure supply system and a water outlet for letting a flow of condensed water to exit the centrifugal device.

The humidity is condensed by elevating the air pressure in the pressure supply system, utilizing the physical principle that the dew point is elevated by the elevated pressure. The pressurized air is then fed through an air inlet to the centrifugal device. The centrifugal device is designed to make use of the rotation of the system to gather the condensed water in a specific region of the centrifugal device from where it can be drained or expelled to the ambient.

According to embodiments of the present invention, the water outlet of the centrifugal device is radially distanced from the rotor axis of the wind turbine in order to receive the flow of condensed water as an effect of a centrifugal reaction to the rotation about the rotor axis of the wind turbine. Particularly, the water outlet may be provided along a periphery of the centrifugal device.

Advantageously, in the centrifugal device the humid pressurized air is subject to a temperature close to the ambient temperature, causing the water content in the compressed air to condense on an inner surface of the reservoir. The rotation of the centrifugal device easily permits to gather the water at the periphery from where it can be drained or expelled to the ambient through the water outlet.

According to embodiments of the present invention, the centrifugal device comprises a rotating reservoir extending axially along a device axis between a first axial end to a second axial end, the water outlet being distanced from the axis device.

The centrifugal device may comprise an air outlet for letting a flow of dry air to exit the centrifugal device.

The air outlet may be provided along the axis device, while the air inlet and the water outlet may be provided along a periphery of the centrifugal device.

Particularly, the air inlet and the water outlet may be provided at one and the other of the first axial end and second axial end, respectively.

The centrifugal device comprises an outlet valve at the water outlet.

The rotating reservoir may be fixed to a hub of the wind turbine, with the device axis coincident or parallel to the rotation axis of the wind turbine.

According to an embodiment of the present invention, the above-described rotating reservoir may include an outlet valve at the water outlet, the outlet valve including an actuator for opening the outlet valve upon reception of an opening command, for example from a controller of the wind turbine.

According to embodiments of the present invention, the centrifugal device comprises:
- a pressure line receiving a flow of the pressurized fluid including humidity from the pressure supply system,
- the pneumatic actuator connected to the pressure line for receiving the flow of the pressurized fluid including humidity,
- an outlet valve positioned downstream of the pneumatic actuator.

According to such embodiments the centrifugal device may extend through the hub and the blades of the wind turbine, up to an outlet valve comprised between the aerodynamic device and a tip section of the wind turbine or at the tip section of the wind turbine.

The outlet valve may be automatically opened by the force of the condensed water towards a tip section of the wind turbine as an effect of a centrifugal reaction to the rotation about the rotor axis of the wind turbine.

The centrifugal effects increase with the radius from the axis of rotation for a given angular speed. As the water is condensed in the circuit, the centrifugal reaction causes it to gather at the outlet valve, until the force upon the water caused by the combination of the centrifugal acceleration and gravity exceeds the opening force of the valve to drain the water.

The difference in density for the liquid and the process air allows the system to remain sealed as long as there is no accumulation of water.

By orienting the valve to minimize centrifugal and gravitational effects on the valve piston/plunger/spool, it can be ascertained that the accumulation of liquid is the only condition leading to the valve opening. The outlet valve prevents the water from entering again the centrifugal device and reaching the pneumatic actuator.

Advantageously, the embodiments comprising a valve at the tip of the blade or close thereto, provides a simple and cost effective solution.

A valve at the tip of the blade or close thereto may be implemented together with the above described rotating reservoir to provide a second redundant dehumidifying solution.

BRIEF DESCRIPTION

Some of the embodiments will be described in detail, with reference to the following figures, wherein like designations denote like members, wherein.

DETAILED DESCRIPTION

Figure 1:
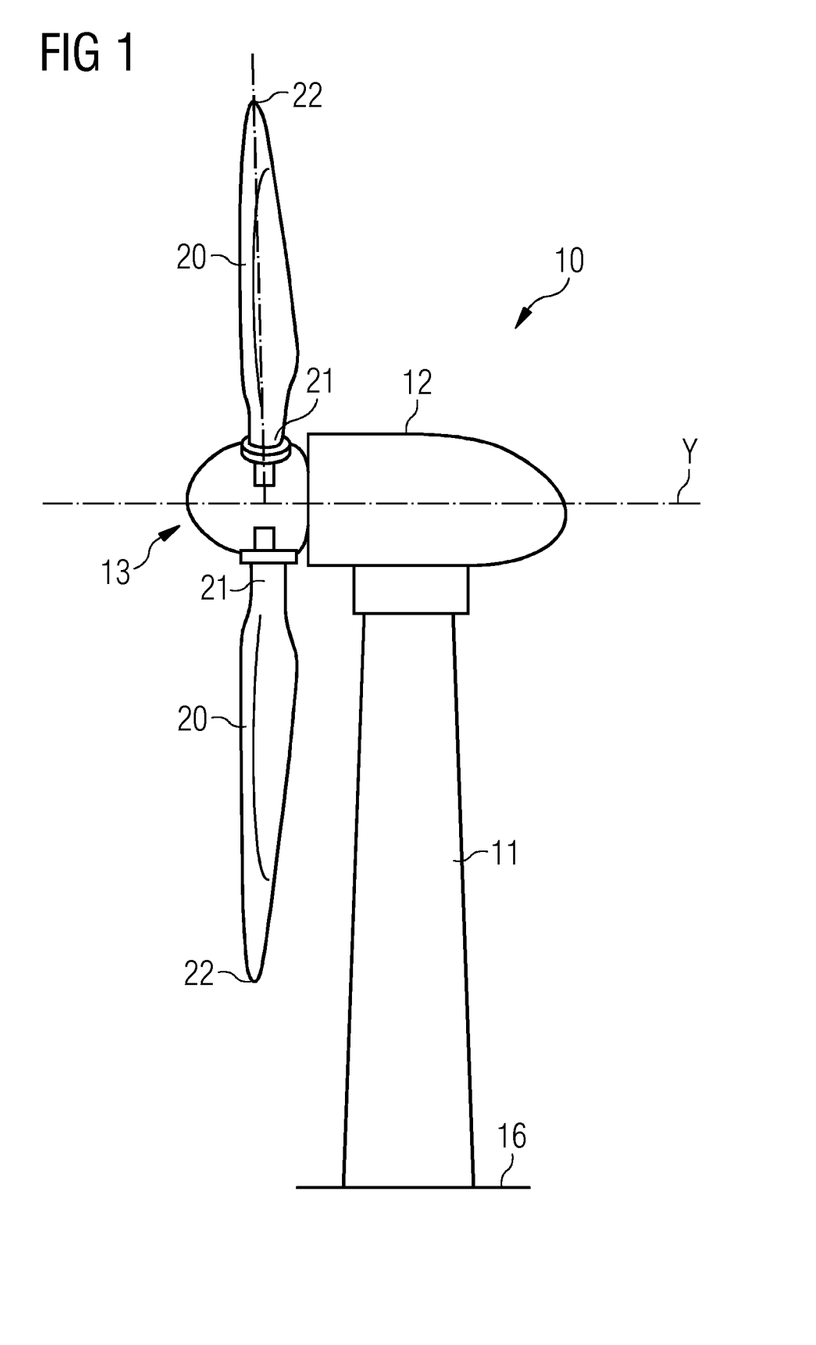
FIG. 1 shows a wind turbine.

FIG. 1 shows a conventional wind turbine 10 for generating electricity. The wind turbine 10 comprises a tower 11 which is mounted on the ground 16 at one end. At the opposite end of the tower 11 there is mounted a nacelle 12. The nacelle 12 is usually mounted rotatable with regard to the tower 11, which is referred to as comprising a yaw axis substantially perpendicular to the ground 16. The nacelle 12 usually accommodates the generator of the wind turbine and the gear box (if the wind turbine is a geared wind turbine). Furthermore, the wind turbine 10 comprises a hub 13 which is rotatable about a rotor axis Y. When not differently specified, the terms axial, radial and circumferential in the following are made with reference to the rotor axis Y. The hub 13 is often described as being a part of a wind turbine rotor, wherein the wind turbine rotor is capable to rotate about the rotor axis Y and to transfer the rotational energy to an electrical generator (not shown).

The wind turbine 1 further comprises at least one blade 20 (in the embodiment of FIG. 1, the wind rotor comprises three blades 20, of which only two blades 20 are visible) mounted on the hub 13. The blades 20 extend substantially radially with respect to the rotational axis Y. Each rotor blade 20 is usually mounted pivotable to the hub 13, in order to be pitched about respective pitch axes. This improves the control of the wind turbine and in particular of the rotor blades by the possibility of modifying the direction at which the wind is hitting the rotor blades 20. Each rotor blade 20 is mounted to the hub 13 at its root section 21. The root section 21 is opposed to the tip section 22 of the rotor blade.

Figure 2:
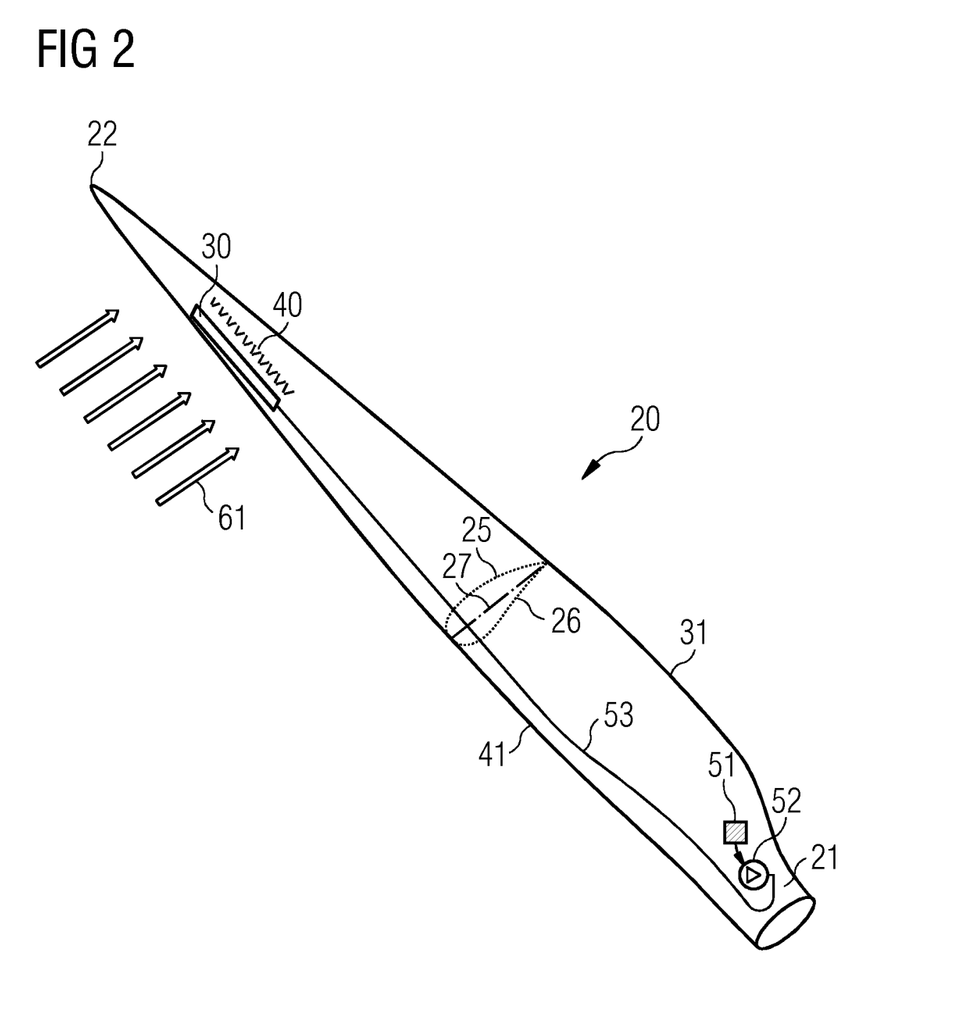
FIG. 2 shows a rotor blade of a wind turbine with an aerodynamic device.

FIG. 2 illustrates the rotor blade 20 comprising an aerodynamic device 30 in the form of an actuated spoiler. Between the root section 21 and the tip section 22 the rotor blade 20 furthermore comprises a plurality of aerofoil sections for generating lift. Each aerofoil section comprises a suction side 25 and a pressure side 26. The aerofoil shape of the aerofoil portion is symbolized by one aerofoil profile which is shown in FIG. 2 and which illustrates the cross-sectional shape of the rotor blade at this spanwise position. Also note that the suction side 25 is divided or separated from the pressure side 26 by a chord line 27 which connects a leading edge 41 with a trailing edge 31 of the rotor blade 20.

The aerodynamic device 30 is arranged on the suction side 25 between the leading edge 41 and the trailing edge 31.

The aerodynamic device 30 in FIG. 2 is movable by a pneumatic actuator (not shown in FIG. 2).

A pressure supply system 52 for operating the pneumatic actuator by a pressurized fluid, for example pressurized air or other pressurized gas. In this context, pressurized air not only comprises positive pressure but also negative pressure, wherein air is sucked (or "drawn") out of the pressure hose of the aerodynamic device 30.

The pressure supply system 52 comprises a pressure line 53 and is controlled by a control unit 51. The pressure line 53 could be in practice realized as tubes or pipes which do not significantly change their volume. The control unit 51 is responsible for setting a specific pressure at the pressure supply system 52 which subsequently leads to a certain predetermined pressure at the aerodynamic device 30.

In the example shown in FIG. 2, the control unit 51 and the pressure supply system 52 are located in the root section 21 of the rotor blade 20. According to other embodiments of the present invention (not shown in the attached figures), these parts could also at least partially be placed elsewhere in the wind turbine 10, such as e.g. in the hub 13 of the wind turbine 10.

The rotor blade 20 additionally comprises a flow regulating unit 40 comprising multiple pairs of vortex generators.

The flow regulating unit 40 are arranged on the suction side 25 of the blade 20 between the aerodynamic device 30 and the trailing edge 31.

According to other embodiments of the present invention (not shown in the attached figures), the flow regulating unit 40 are arranged on the suction side 25 of the blade 20 between the leading edge 41 and the aerodynamic device 30.

According to other embodiments of the present invention (not shown in the attached figures), the flow regulating unit 40 are not present and only the aerodynamic device 30 is used to regulate the flow on the surface of the blade 20.

According to other embodiments of the present invention (not shown in the attached figures), the blade 20 comprises a plurality of aerodynamic devices 30.

Figure 3:
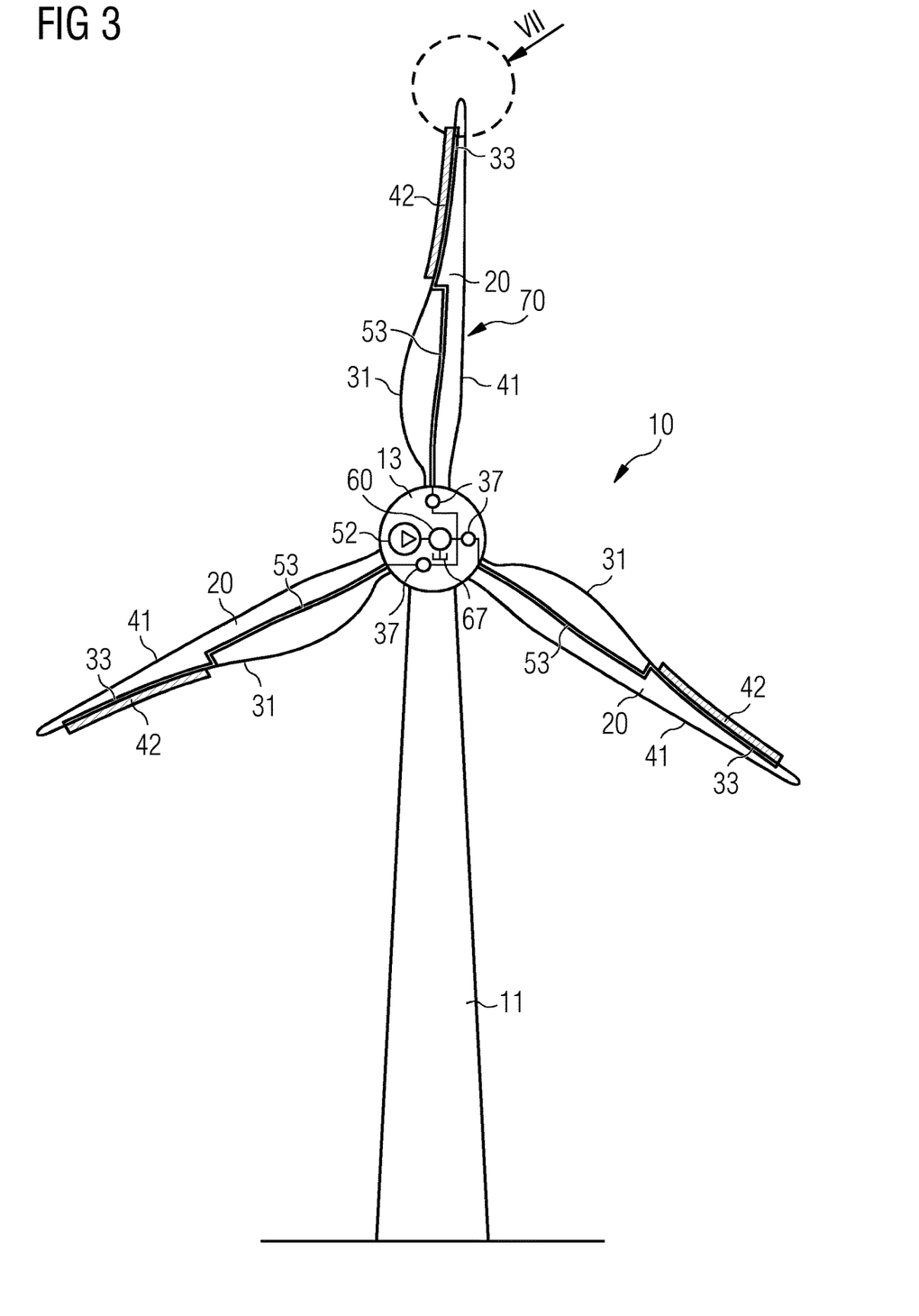
FIG. 3 shows a wind turbine including aerodynamic devices, a pressure supply system, a first and a second embodiment of a centrifugal dehumidifying device according to embodiments of the present invention.

FIG. 3 shows the wind turbine 10 in a front view. The wind turbine 10 comprises three rotor blades 20, wherein each rotor blade 20 comprises an aerodynamic device 42 configured as a trailing edge flap. The trailing edge flap 42 is mounted at the trailing edge 31 of the rotor blades 20 and extends along the trailing edge 31 in the outboard part of the respective rotor blades. According to another embodiment of the present invention (not shown) each rotor blade 20 includes the trailing edge flap 42, the actuated spoiler 30 and the vortex generators 40. Differently from the embodiment of FIG. 2, one pressure supply system 52 is located centrally in the hub 13. The pressure supply system 52 provides pressurized air to each of the three rotor blades 20. Three pressure lines 53 extend from the pressure supply system 52 to trailing edge flaps 42 of the individual rotor blades 20, respectively. The transmission of pressurized air through the pressure lines 53 is controllable via three individual valves 37, one for each rotor blade 20. After entering the rotor blades 20 via the root section, the pressure lines 53 run along the rotor blades 20 to the trailing edge flaps 42. Each pressure line 53 enters a pneumatic actuator 33 at an inlet port and supplies the pneumatic actuator 33 with pressurized air.

Between the pressure supply system 52 and the three pressure lines 53 the wind turbine 10 comprises a first embodiment of a centrifugal device 60 rotatable about the rotor axis Y for dehumidifying a flow of the pressurized fluid (for example air) including humidity from the pressure supply system 52.

Figure 4:
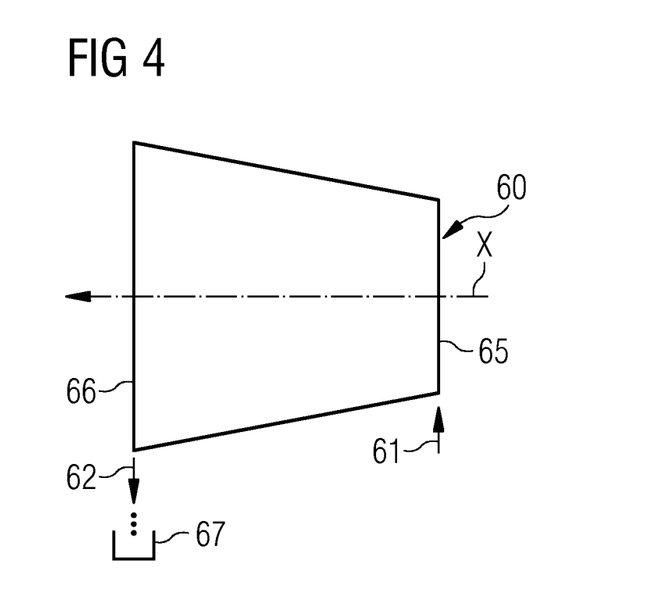
FIG. 4 shows a lateral view of the centrifugal dehumidifying device of FIG. 3.
Figure 5:
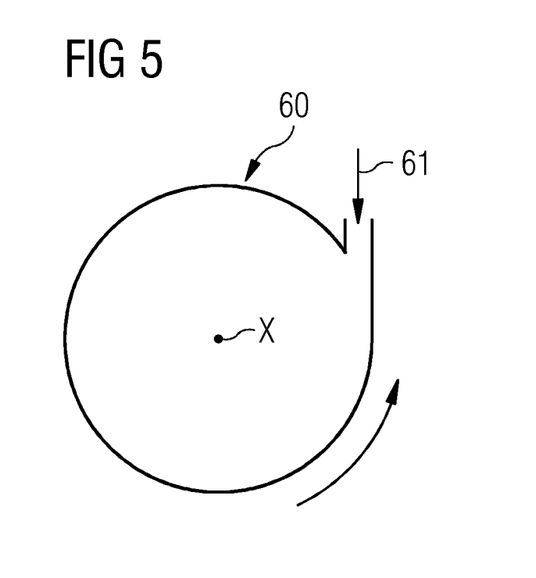
FIG. 5 shows a first frontal view of the centrifugal dehumidifying device of FIG. 3.
Figure 6:
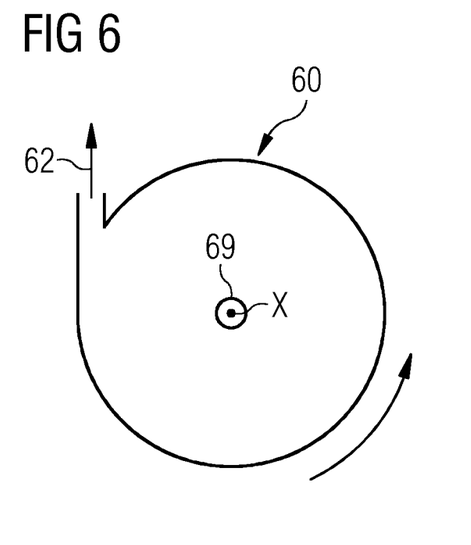
FIG. 6 shows a second frontal view of the centrifugal dehumidifying device of FIG. 3.

FIGS. 4 to 6 shows details of the first embodiment of a centrifugal device 60, which is in the form of a rotating reservoir fixed to the hub 13 and rotating together with the wind turbine rotor. The rotating reservoir 60 has a conical or cylindrical shape extending axially along a device axis X between a first axial end 65 to a second axial end 66. The device axis X may be coincident or distanced or parallel to the rotor axis Y of the wind turbine.

The rotating reservoir 60 comprises an air inlet 61 at the first axial end 65 for receiving the flow of the pressurized air including humidity from the pressure supply system 52 and a water outlet 62 at the second axial end 66 for letting a flow of condensed water to exit the centrifugal device 60.

The air inlet 61 and the water outlet 62 are oriented transversally to the device axis X, in particular the air inlet 61 and the water outlet 62 may be tangentially oriented with respect to the conical or cylindrical surface of the centrifugal device 60.

The air inlet 61 and the water outlet 62 are provided along a periphery of the centrifugal device 60.

In the rotating reservoir 60 the humid pressurized air is subject to a temperature close to the ambient temperature, causing the water content in the compressed air to condense on the conical or cylindrical periphery of the rotating reservoir 60. The rotation about the rotor axis Y permits to gather the flow of condensed water. From the water outlet 62, the flow of condensed water is sent to a drainage device 67 or expelled to the ambient.

According to other embodiments of the present invention the water outlet 62 of the centrifugal device is radially distanced from the rotor axis of the wind turbine in order to receive the flow of condensed water as an effect of a centrifugal reaction to the rotation about the rotor axis Y.

The rotating reservoir 60 further comprises an air outlet 69 at the second axial end 66, positioned along the device axis X. The air outlet 69 lets a flow of dry air to exit the rotating reservoir 60 after the flow of water has been separated from the flow of pressurized humid air inside the rotating reservoir 60.

According to embodiments of the present invention, an outlet valve 63 is provided at the water outlet 62 of the rotating reservoir 60. The outlet valve includes an actuator for opening the outlet valve upon reception of an opening command, which may be sent by a control unit of the wind turbine 10.

Figure 7:
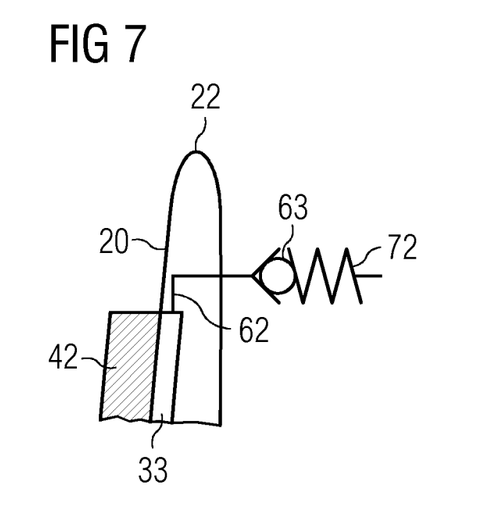
FIG. 7 shows a magnified view of the detail VII of FIG. 3, illustrating a component of the second embodiment of a centrifugal dehumidifying device according to embodiments of the present invention.

FIG. 7 shows details of a second embodiment of a centrifugal device 60 included in the wind turbine of FIG. 3. Like the first embodiment, the second embodiment is rotatable about the rotor axis Y for dehumidifying a flow of the pressurized fluid (for example air) including humidity from the pressure supply system 52. The centrifugal device 60 receives a flow of the pressurized fluid including humidity from the pressure supply system 52 and is provided with a water outlet 62 for letting a flow of condensed water to exit the centrifugal device 60.

For each blade 20, the centrifugal device 60 comprises:
the respective pressure line 53 receiving a flow of the pressurized fluid including humidity from the pressure supply system 52,
the pneumatic actuator 33 connected to the pressure line 53 for receiving the flow of the pressurized fluid including humidity,
an outlet valve 63 positioned downstream of the pneumatic actuator 33, for letting a flow of condensed water to exit the centrifugal device 60.

A control volume may be included between the pneumatic actuator 33 and the outlet valve 63. The outlet valve 63 is comprised between the aerodynamic device 30 and a tip section 22 of the wind turbine 10 and is automatically opened by the flow of condensed water moving towards a tip section 22 of the wind turbine 10 as an effect of a centrifugal reaction to the rotation about the rotor axis Y of the wind turbine 10.

A spring 72 is associated to the outlet valve 63 for keeping the outlet valve 63 normally closed when no flow of condensed water is present.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising:
   at least one rotor blade;
   at least one aerodynamic device for influencing an airflow flowing from a leading edge section of the at least one rotor blade to a trailing edge section of the at least one rotor blade, wherein the at least one aerodynamic device is mounted at a surface of the at least one rotor blade;
   a pneumatic actuator of the at least one aerodynamic device for actuating the at least one aerodynamic device at least between a first protruded configuration and a second retracted configuration;
   a pressure supply system for operating the pneumatic actuator with a pressurized fluid; and
   a centrifugal device rotatable about a rotor axis of the wind turbine, the centrifugal device comprising an air inlet for receiving a flow of the pressurized fluid including humidity from the pressure supply system, a water outlet for letting a flow of condensed water to exit the centrifugal device, and an air outlet positioned at an opposite end of the centrifugal device than the air inlet for letting a flow of dry air to exit the centrifugal device.

2. The wind turbine according to the claim 1, wherein the water outlet of the centrifugal device is radially distanced from the rotor axis of the wind turbine to receive the flow of condensed water as an effect of a centrifugal reaction to a rotation about the rotor axis of the wind turbine.

3. The wind turbine according to claim 2, wherein the centrifugal device is fixed to a hub of the wind turbine.

4. The wind turbine according to claim 2, wherein the water outlet of the centrifugal device is provided along a periphery of the centrifugal device.

5. The wind turbine according to claim 1, wherein the centrifugal device comprises a rotating reservoir extending axially along a device axis between a first axial end to a second axial end, the water outlet being distanced from the device axis.

6. The wind turbine according to the claim 5, wherein the air outlet is provided along the device axis.

7. The wind turbine according to claim 5, wherein the air inlet is provided at one of the first axial end and second axial end and the water outlet is provided at the other of the first axial end and the second axial end.

8. A wind turbine comprising:
   at least one rotor blade;
   at least one aerodynamic device for influencing an airflow flowing from a leading edge section of the at least one rotor blade to a trailing edge section of the at least one rotor blade, wherein the at least one aerodynamic device is mounted at a surface of the at least one rotor blade;
   a pneumatic actuator of the at least one aerodynamic device for actuating the at least one aerodynamic device at least between a first protruded configuration and a second retracted configuration;
   a pressure supply system for operating the pneumatic actuator with a pressurized fluid; and
   a centrifugal device rotatable about a rotor axis of the wind turbine, the centrifugal device comprising an air inlet for receiving a flow of the pressurized fluid including humidity from the pressure supply system and a water outlet for letting a flow of condensed water to exit the centrifugal device,
   wherein the centrifugal device comprises a water outlet valve at the water outlet positioned between the at least one aerodynamic device and a tip section of the at least one rotor blade.

9. The wind turbine according to claim 8, wherein the centrifugal device comprises:
   a pressure line receiving a flow of the pressurized fluid including humidity from the pressure supply system, the pneumatic actuator connected to the pressure line for receiving the flow of the pressurized fluid including humidity,
   wherein the outlet valve positioned downstream of the pneumatic actuator.

10. The wind turbine according to claim 8, wherein the outlet valve is automatically opened by the flow of condensed water moving towards the tip section of the wind turbine as an effect of a centrifugal reaction to a rotation about the rotor axis of the wind turbine.

11. The wind turbine according to claim 8, wherein the outlet valve is positioned at the tip section of the wind turbine.

12. The wind turbine according to the claim 8, wherein the outlet valve at the water outlet includes an actuator for opening the outlet valve upon reception of an opening command.

* * * * *